(12) United States Patent
Shindo

(10) Patent No.: US 8,202,602 B2
(45) Date of Patent: Jun. 19, 2012

(54) HONEYCOMB SEGMENT WITH SPACER AND HONEYCOMB STRUCTURE

(75) Inventor: Hiroyuki Shindo, Nogoya (JP)

(73) Assignee: NGK Insulators, Ltd., Nagoya (JP)

( * ) Notice: Subject to any disclaimer, the term of this patent is extended or adjusted under 35 U.S.C. 154(b) by 723 days.

(21) Appl. No.: 12/352,026

(22) Filed: Jan. 12, 2009

(65) Prior Publication Data

US 2009/0186188 A1 Jul. 23, 2009

(30) Foreign Application Priority Data

Jan. 17, 2008 (JP) ................................. 2008-007939

(51) Int. Cl.
*B32B 3/12* (2006.01)
(52) U.S. Cl. ........................................ 428/116; 428/118
(58) Field of Classification Search .................. None
See application file for complete search history.

(56) References Cited

U.S. PATENT DOCUMENTS

2004/0108056 A1* 6/2004 Fujita et al. .................. 156/276

FOREIGN PATENT DOCUMENTS

| EP | 1 435 348 A1 | 7/2004 |
|---|---|---|
| EP | 1 790 623 A1 | 5/2007 |
| EP | 1 854 773 A1 | 11/2007 |
| EP | 2 006 010 A1 | 12/2008 |
| JP | A-2000-7455 | 1/2000 |
| JP | A-2002-102627 | 4/2002 |
| WO | WO 03/031371 A1 | 4/2003 |
| WO | WO 2007/068022 A1 | 6/2007 |

* cited by examiner

*Primary Examiner* — Gordon R Baldwin
(74) *Attorney, Agent, or Firm* — Oliff & Berridge, PLC

(57) ABSTRACT

A honeycomb segment 10 is provided with a spacer(s) 11 in each of predetermined regions from both the end face toward inside along the axial direction on one end side and the other end side in the axial direction of the outer peripheral surface 7s of the outer peripheral wall 7 so that the spacer(s) occupies (y) 30 to 80% of a route length through the center from a long side 7x to the other long side 7x of the outer peripheral surface. Since spacers are aligned in the direction along the short side 7y, the spacers are formed in such a manner that the length $b_1+b_2$ in the short side direction of the spacers 11 occupies 30 to 80% of a length a of the short side 7y, thereby a honeycomb structure having practically no misalignment between segments upon bonding, with little dimensional deviation can be obtained.

4 Claims, 6 Drawing Sheets

HONEYCOMB SEGMENT WITH SPACER AND HONEYCOMB STRUCTURE

BACKGROUND OF THE INVENTION AND RELATED ART STATEMENT

The present invention relates to a honeycomb segment with spacer and a honeycomb structure.

A honeycomb structure is in heavy usage as a trapping filter for exhaust gas for environmental improvement, pollution protection, and the like. For example, a SiC DPF (diesel particulate filter) is currently manufactured by unitarily joining defined 16 substrates (honeycomb segments) with a bonding material (ceramic cement) (see, e.g., Patent Document 1). However, there arises a problem of having cracks in a portion having low characteristics upon a thermal resistant test because of variance in characteristics due to variance in thickness (bonding width) of a bonding layer.

Therefore, there has been disclosed a technique of bonding honeycomb segments using "spacers" in order to stabilize thickness of the bonding layer (see, e.g., Patent Document 2).

[Patent Document 1] JP-A-2000-7455
[Patent Document 2] JP-A-2002-102627

However, when a segment has a bent shape in this method, there remains variance in bonding width in the end face, and thereby an opening ratio of the honeycomb structure also has variance. In addition, there arise problems of easy crashing of spacer and easy causing of misalignment between honeycomb segments when honeycomb segments are bonded.

The present invention aims to provide a honeycomb segment with spacer capable of allowing the bonding layer between honeycomb segments to have desired thickness, inhibiting misalignment upon bonding honeycomb segments, and forming a honeycomb structure having little dimensional error and a honeycomb structure constituted of the honeycomb segment with spacers.

SUMMARY OF THE INVENTION

The present inventors found out that the above problems can be solved by forming spacers having a length of 30 to 80% of a route length through the center from a long side to the other long side of an outer peripheral surface on an outer peripheral surface of an outer peripheral wall of a honeycomb segment, thereby suppressing protrusion of a bonding material. That is, according to the present invention, there are provided the following honeycomb segment with spacer and honeycomb structure.

[1] A honeycomb segment with spacer comprising: a plurality of cells defined by porous partition walls, extending through an axial direction, and functioning as fluid passages, and spacers arranged in a predetermined region from one end face of the axial direction toward inside along the axial direction on an outer peripheral surface of an outer peripheral wall and in a predetermined region from the other end face of the axial direction toward inside along the axial direction; wherein the spacers are formed so as to occupy 30 to 80% of a route length through the center from a long side to the other long side of an outer peripheral surface of an outer peripheral wall.

[2] The honeycomb segment with spacer according to the above [1], wherein the spacers are formed in a region within 20% of the long side from one end face of the axial direction toward inside along the axial direction and in a region within 20% of the long side from the other end face toward inside along the axial direction.

[3] The honeycomb segment with spacer according to the above [1] or [2], wherein the spacers are arranged along a short side direction in one of the ranges to occupy 30 to 80% of a length of the short side in the short side direction.

[4] A honeycomb structure formed by piling up honeycomb segment with spacers according to any one of the above [1] to [3].

By forming spacers so as to occupy 30 to 80% of a route length through the center from a long side to the other long side of an outer peripheral surface on each of one end face side and the other end face side of the outer peripheral surface of the outer peripheral wall of a honeycomb segment, protrusion of a bonding material can be suppressed, and honeycomb segments can be assembled to form a honeycomb structure with a fixed bonding width between the segments each other. Thus assembled honeycomb structure having uniform bonding layers can be manufactured.

REFERENCE NUMERALS

1: honeycomb structure, 1a: honeycomb segment bonded body, 2: partition wall, 3: cell, 5: bonding layer, 7: outer peripheral wall, 7s: outer peripheral surface, 7x: long side (of outer peripheral surface), 7y: short side (of outer peripheral surface), 8: end face, 10: honeycomb segment, 11: spacer, 20: vertical backing plate, 21: horizontal backing plate

DETAILED DESCRIPTION OF THE INVENTION

Hereinbelow, embodiments of the present invention will be described with referring to drawings. The present invention is not limited to the following embodiments, and changes, modifications, and improvements may be added to the embodiments as long as they do not deviate from the scope of the present invention.

Figure 1:
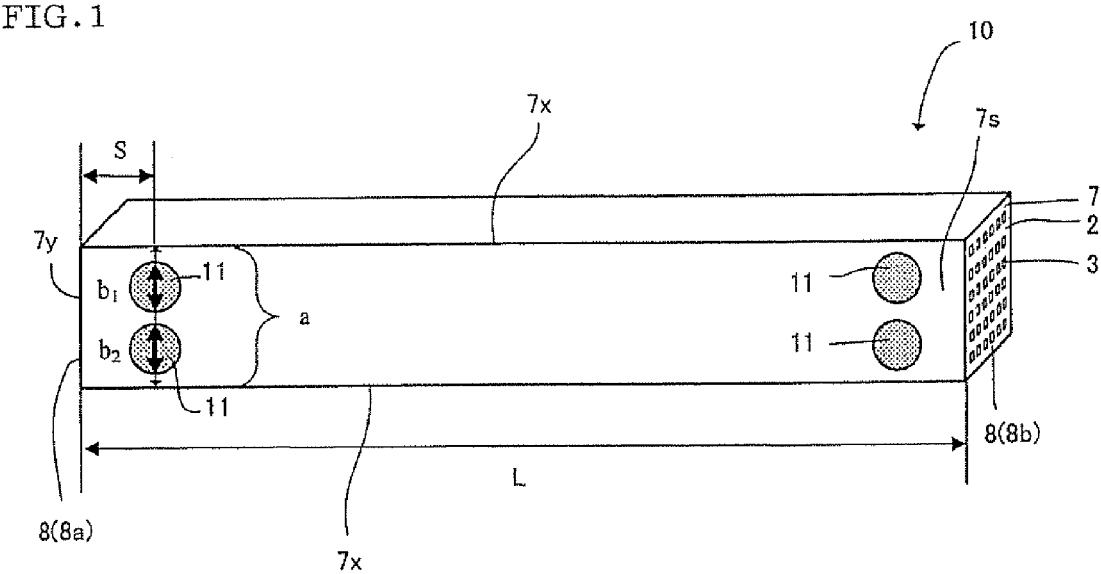
FIG. 1 is a schematic view showing an embodiment of a honeycomb segment with spacer of the present invention.
Figure 8:
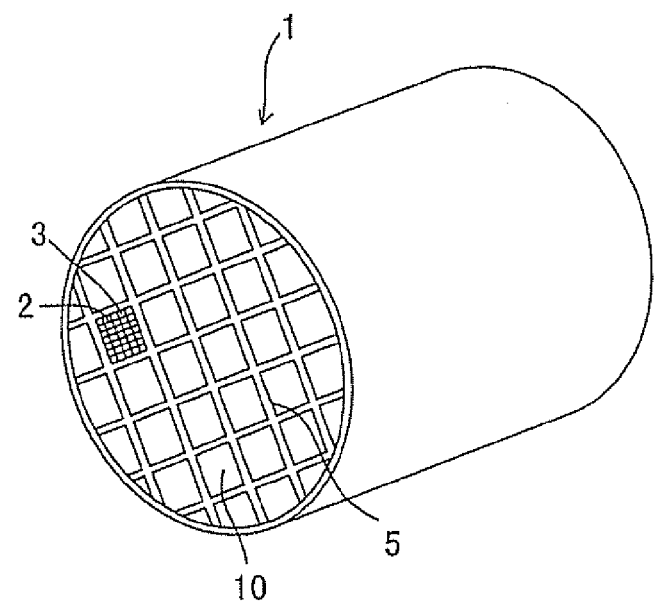
FIG. 8 is a perspective view showing an embodiment of a honeycomb structure formed by piling up honeycomb segment with spacers of the present invention.

FIG. 1 shows a honeycomb segment 10 having spacers 11 formed thereon. The honeycomb segment 10 is formed of ceramic and has outer peripheral walls 7, partition walls 2 formed inside the outer peripheral walls 7, and a plurality of cells 3 partitioned by the partition walls 2. The spacers were formed on the outer peripheral surfaces 7s of the outer peripheral walls 7. By bonding a plurality of honeycomb segments 10, a honeycomb structure 1 shown in FIG. 8 is obtained.

The honeycomb segment with spacer 10 of the present invention shown in FIG. 1 has a plurality of cells 3 defined by porous partition walls 2, extending in the axial direction, and functioning as fluid passages. In the case of using the honeycomb structure 1 where honeycomb segments 10 of the present invention are bonded as a filter, it is preferable that some of the cells 3 are plugged in the end face a of the honeycomb segment 10. It is particularly preferable that the adjacent cells 3 are alternately plugged in the end faces 8 opposite to each other and that each of the end faces 8 shows a checkerwise pattern. By such plugging, for example, the target fluid for purification enters from one of the end faces 8, passes through the partition walls, and flows out from the other end face 8. When the fluid passes through the partition walls 2, porous partition walls 2 play a role of a filter to remove target substances.

The honeycomb segment 10 is provided with the spacers 11 in predetermined regions from one end side of the axial direction toward inside along the axial direction on an outer peripheral surface 7s of an outer peripheral wall 7 and in a predetermined region from the other end side of the axial direction toward inside along the axial direction. The spacers 11 are formed so as to occupy 30 to 80% of a route length through the center from a long side 7x to the other long side 7x of an outer peripheral surface 7s. In one region, one or a plurality of spacers 11 are arranged, and FIG. 1 shows an embodiment where two spacers are formed in one region. Since spacers 11 are aligned in a direction along the short side 7y in the embodiment of FIG. 1, the spacers 11 are formed in such a manner that the length $b_1+b_2$ in the short side direction of the spacer 11 occupies 30 to 80% with respect to the length a of the short side 7y. In addition, the positions where the spacers 11 are formed are in predetermined regions from both the end faces on one end side and the other end side toward inside along the axial direction, specifically, in a region of 20% or less of the long side from one end face and in a region of 20% or less of the long side from the other end face of the axial direction toward inside along the axial direction. That is, S shown in FIG. 1 shows 20% of the length L of the long side 7x, and spacers 11 are formed on the end face side with respect to S. When the spacers are disposed in the vicinity of the end faces, the spacers are hardly influenced by the shape such as warpage of segment, and therefore bonding width can stably be formed.

Figure 2:
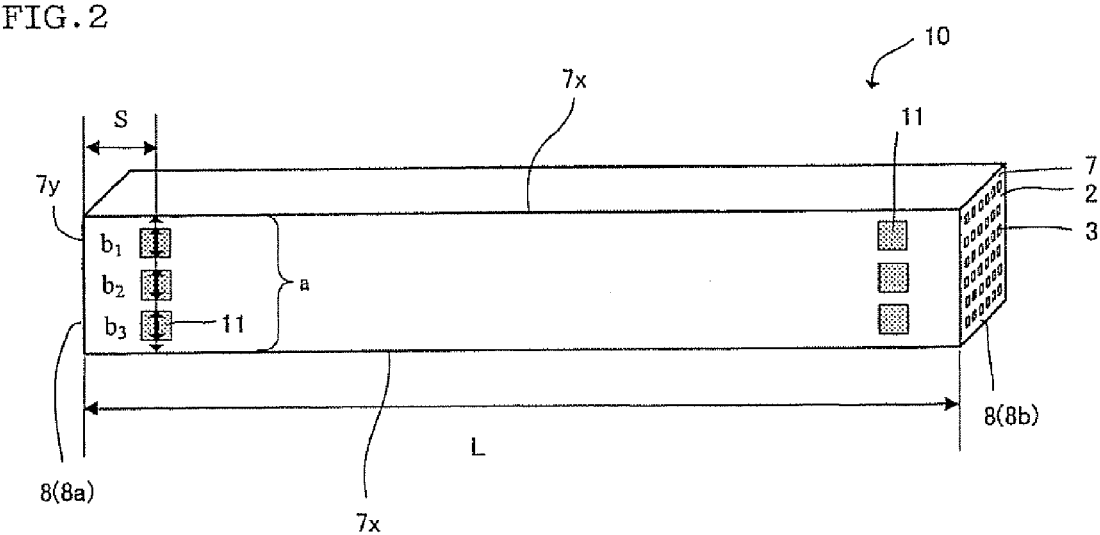
FIG. 2 is a schematic view showing another embodiment of a honeycomb segment with spacer of the present invention.

Incidentally, there is no limitation on the shape of the spacers 11 as long as the spacers are formed so as to occupy 30 to 80% of a route length through the center from a long side on one side to a long side on the other side of an outer peripheral surface. The spacers 11 of FIG. 1 are formed to have a cylindrical shape (see FIG. 7). FIG. 2 shows an example where three quadrangular prism-shaped spacers are formed in one region. In the case of FIG. 2, the length $b_1+b_2+b_3$ in the short side direction of three spacers is 30 to 80% of the short side length a.

About one to three spacers 11 are preferably formed in one region in that they function as supports and that they can easily be produced. However, since the case of one spacer shows weak support, and parallelism can hardly be obtained, the case of two spacers is most preferable.

Figure 9:
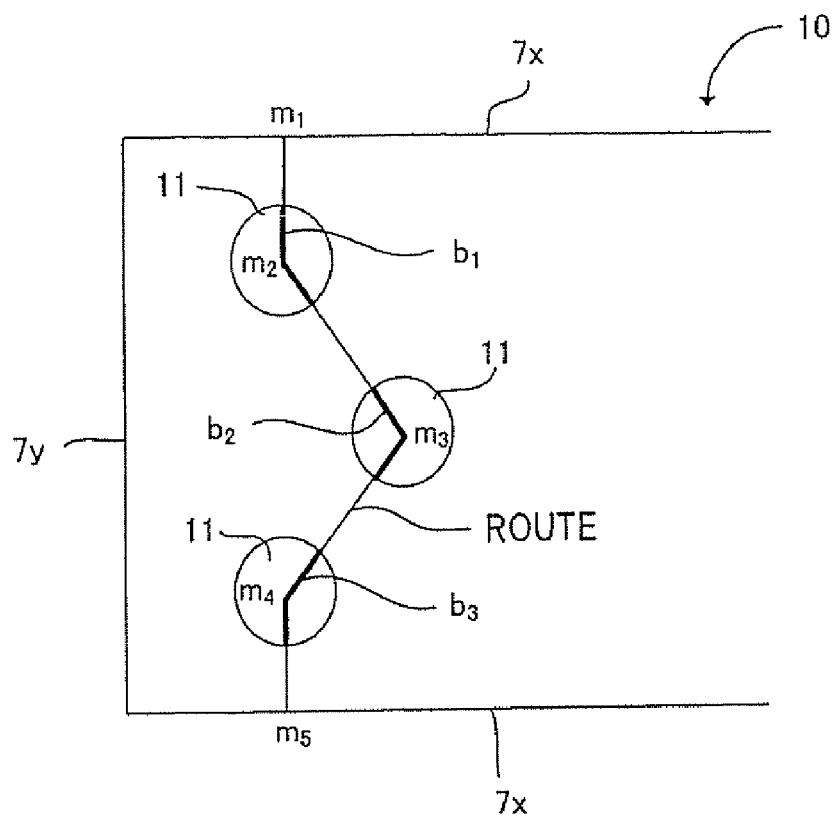
FIG. 9 is an explanatory view for describing the idea of a route.
Figure 10:
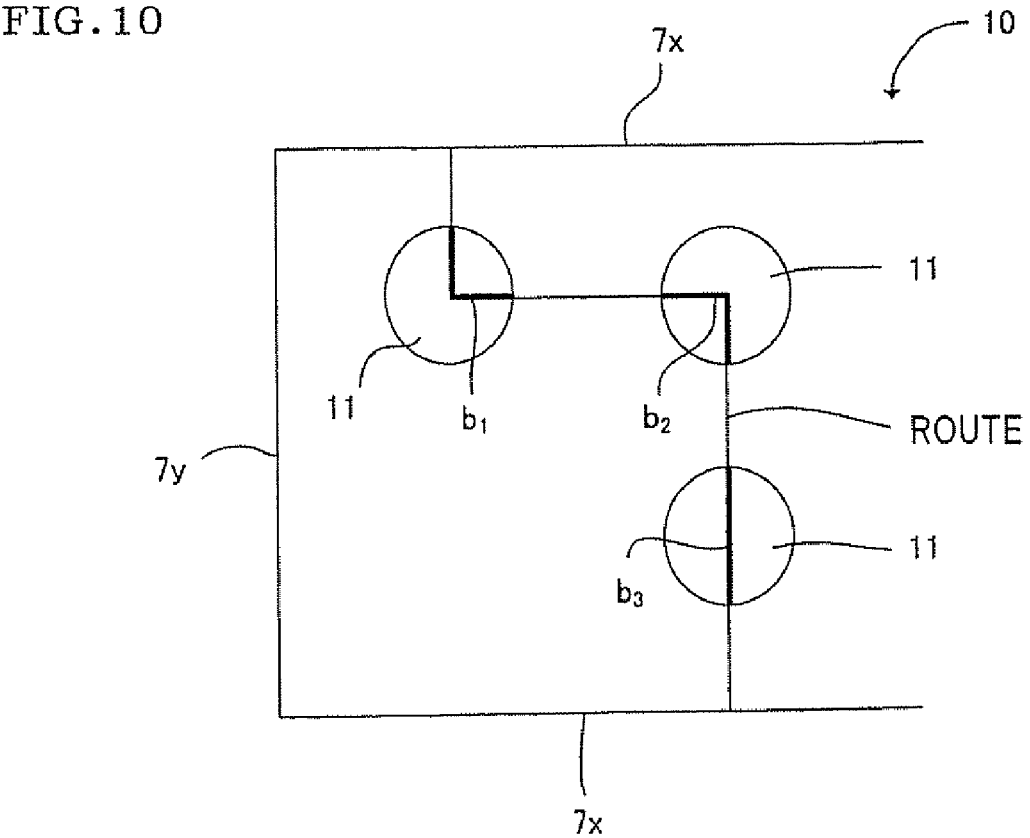
FIG. 10 is another explanatory view for describing the idea of a route.

In addition, an idea of a route length in the case that the spacers 11 are not aligned in the direction along the short side 7y will be described. As shown in FIG. 9, the route length is length of a shortest route passing through the centers of the spacers 11 from a long side 7x on one side to the long side 7x on the other side on the outer peripheral surface 7s. That is, the route passes through the centers $m_2$, $m_3$, and $m_4$ of the spacers 11, $m_1$ is determined by drawing a perpendicular line from $m_2$ to a long side 7x, $m_5$ is determined by drawing a perpendicular line from $m_4$ to the other long side 7x, and the length of the route from $m_1$ to $m_5$ is determined as the route length. The spacers 11 are formed so that the length (heavy-line portions, $b_1+b_2+b_3$, in FIG. 9) of the spacers 11 on the route occupies 30 to 80% of the whole route length. In addition, as shown in FIG. 10, also in the case that the spacers 11 are aligned in the direction along the long side, the route length should be considered as the shortest length of the route passing through the centers of the spacers 11 from one long side 7x to the other long side 7x of the outer peripheral surface. The reason why the length of the spacers with respect to the route length (spacer ratio) is considered is because the spacer ratio influences on flowability of a bonding material. That is, when the proportion of the spacers 11 with respect to the route length is smaller, it means that the gap where the bonding material flows is larger, and, when the proportion of the spacers 11 with respect to the route length is larger, it means that the gap where the bonding material flows is smaller.

Figure 11:
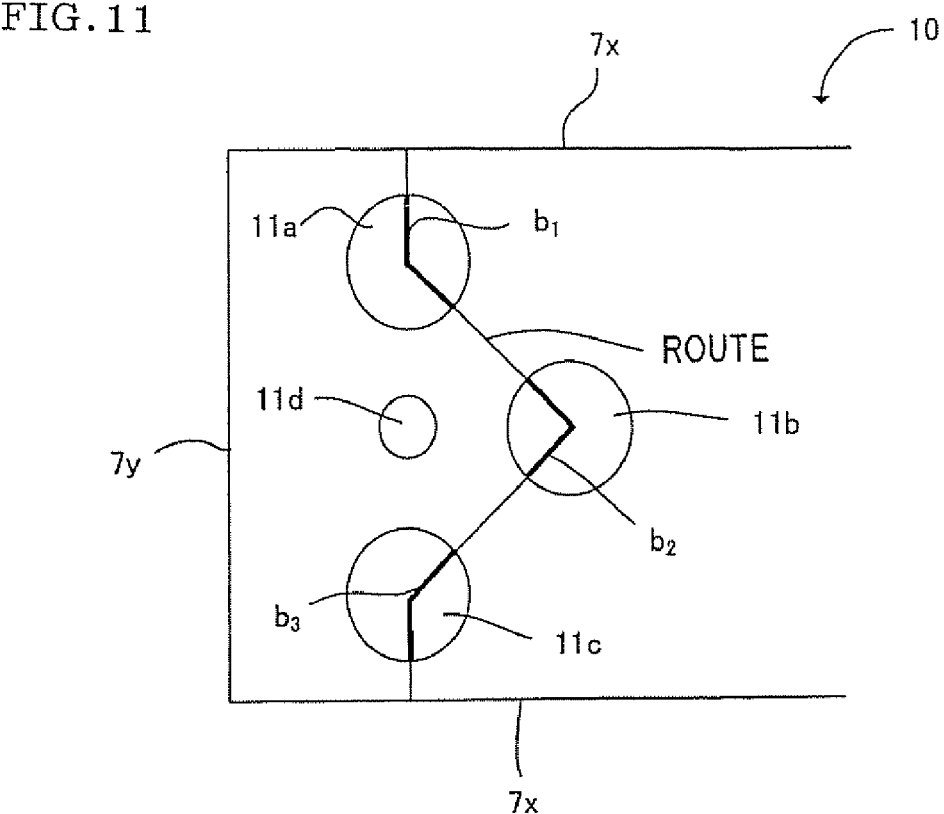
FIG. 11 is an explanatory view for describing the idea of a route in the case that spacers are aligned in the long side direction.

In addition, as shown in FIG. 11, in the case that the spacers 11b and 11d are aligned in the long side direction, a route passing through the spacer 11 dominant with respect to the flow resistance should be considered. That is, when the spacers 11 have different sizes, a route passing through the spacer 11 having the largest area should be considered. In FIG. 11, between the spacer 11b and the spacer 11d aligned in the long side direction, since the spacer 11d is small and does not contribute to flow resistance, the route passing through the spacers 11a, 11b, and 11c is considered, and the spacers 11 are formed in such a manner that the length (heavy-line portions, $b_1+b_2+b_3$, in FIG. 11) of the spacers 11a, 11b and 11c on the route is 30 to 80% of the whole route length.

Figure 12:
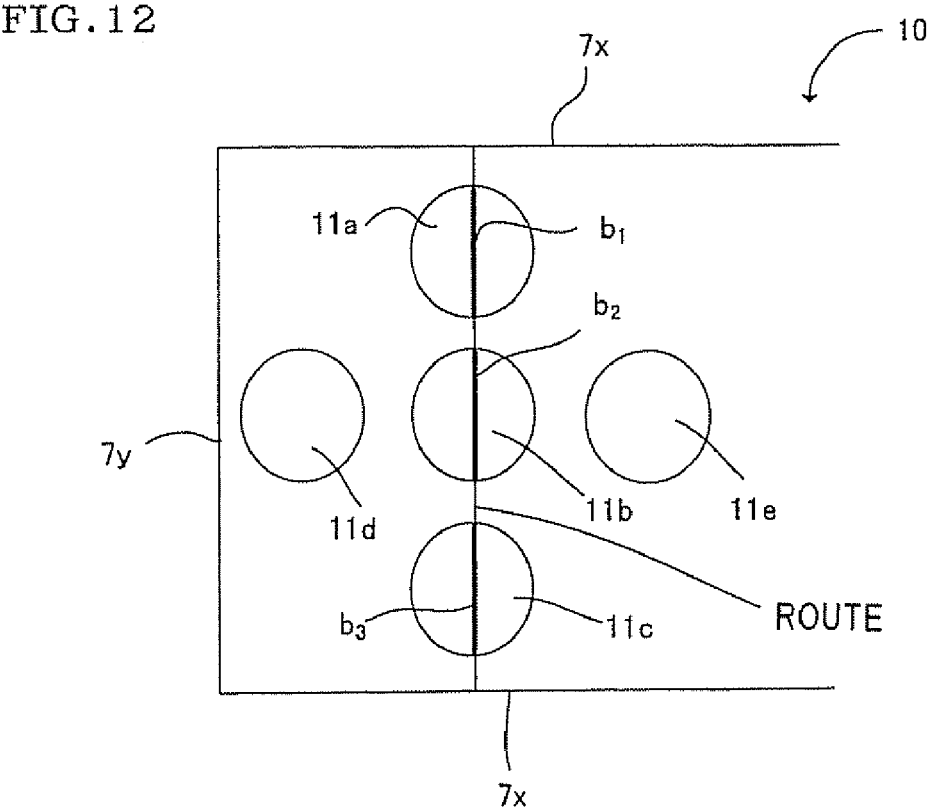
FIG. 12 is another explanatory view for describing the idea of a route in the case that spacers are aligned in the long side direction.

As shown in FIG. 12, when spacers 11b, 11d, and 11e having the same size are aligned in the long side direction, since the portion having the shortest route becomes rate-controlling step, only the portion has to be considered. That is, in FIG. 12, the route passing through the spacers 11a, 11b, and 11c, which is the shortest route, should be considered, and the spacers are formed in such a manner that the length (heavy-line portions, $b_1+b_2+b_3$, in FIG. 12) of the spacers 11a, 11b, 11c on the route is 30 to 80% of the whole route length.

Figure 3:
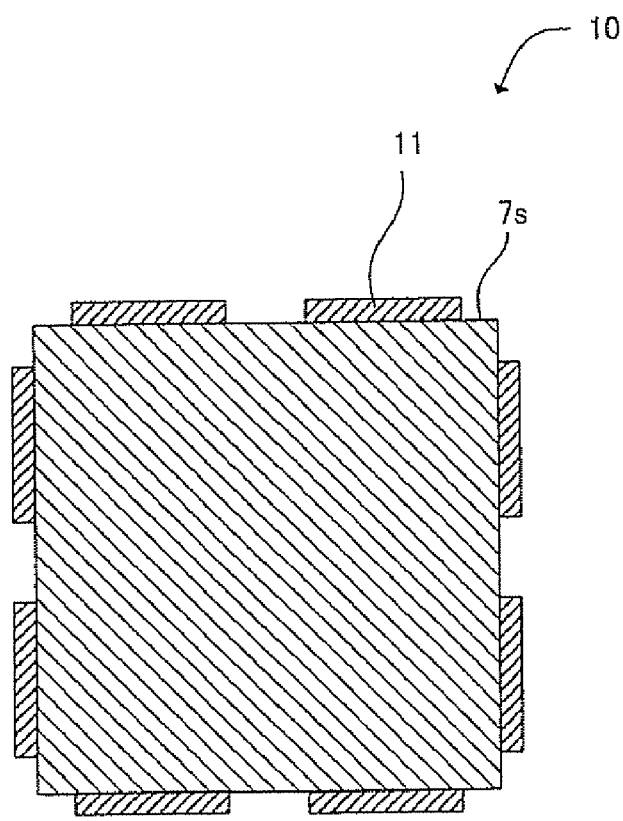
FIG. 3 is a cross-sectional view showing a cross section perpendicular to the axial direction of a honeycomb segment.
Figure 4:
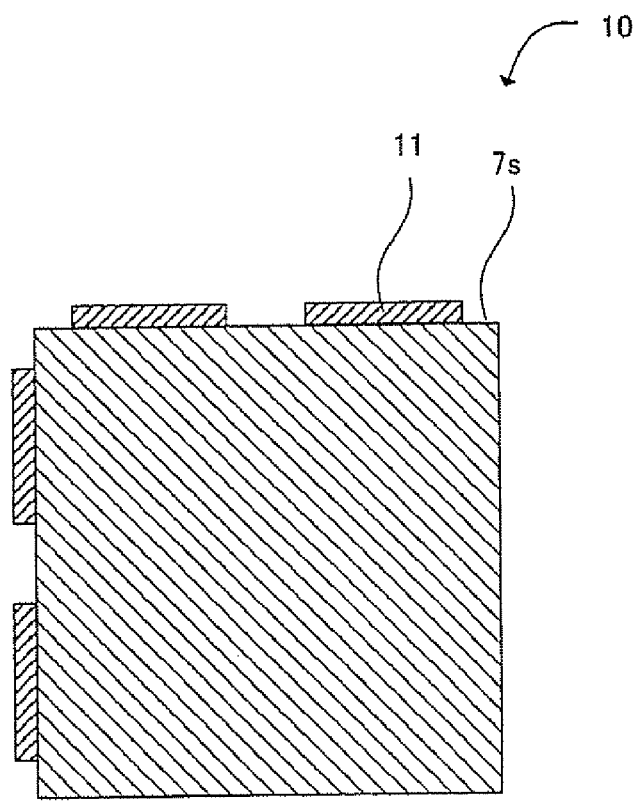
FIG. 4 is a cross-sectional view of another embodiment showing a cross section perpendicular to the axial direction of a honeycomb segment.

FIGS. 3 and 4 show cross-sectional views cut along a plane perpendicular to the axial direction of the honeycomb segment 10 of FIG. 1 (cells 3 are omitted). On the honeycomb segment 10 of an embodiment shown in FIG. 1, two spacers on each of the end sides of the axial direction in an outer peripheral surface 7s of the outer peripheral wall 7. Four spacers 11 are formed on each of four outer peripheral surfaces 7s as shown in FIG. 3 or on each of two adjacent outer peripheral surfaces 7s as shown in FIG. 4 (Incidentally, the number of spacers 11 is not limited to the number in the present embodiment).

In the present invention, the honeycomb segment 10 can be formed of a ceramic material, and the ceramic is preferably selected from the group consisting of cordierite, SiC, alumina, mullite, silicon nitride, zirconium phosphate, aluminum titanate, zirconia, titania, and a combination thereof from the viewpoints of strength, thermal resistance, and the like. Alternatively, the material may contain one of Fe—Cr—Al based metals, nickel based metals, metal silicon (Si) and silicon carbide (SiC).

In the case that the honeycomb segment bonded body 1a of the present invention is used for a DPF, it is preferable to use silicon carbide or a silicon-silicon carbide based composite phase from the viewpoint of improving thermal resistance, and it is preferable to use cordierite from the view point of lowering the thermal expansion coefficient to show good thermal shock resistance. In addition, in the case that the honeycomb segment bonded body 1a is of metal silicon (Si) and silicon carbide (SiC) in the present invention, when Si content defined by Si/(Si+SiC) of the honeycomb segment bonded body 1a is too small, effect of adding Si cannot be obtained to deteriorate strength. When the content is above 50 mass %, effect in thermal resistance and high thermal conductivity, which are characteristics of SiC, cannot be obtained. The Si content is preferably 5 to 50 mass %, more preferably 10 to 40%.

To the above raw material are added a binder such as methyl cellulose and hydroxypropoxylmethyl cellulose, an organic pore former, a surfactant, water, and the like to prepare kneaded clay having plasticity. The kneaded clay is subjected to, for example, extrusion-forming to form a quadrangular prism-shaped honeycomb formed body having a large number of cells 3 partitioned by the partition walls 2 and extending through in the axial direction. After the honeycomb formed body is dried by, for example, microwaves and hot air, it is calcined to remove the binder and the organic pore former, followed by firing to manufacture a honeycomb segment 10.

In addition, the plugging portions in the case that cells 3 are plugged in the end face 8 preferably contain, as the main crystal phase, at least one kind of a crystal phase selected from the components suitable for the main phase for the aforementioned partition walls 2, more preferably contains, as the main crystal phase, a crystal phase of a kind similar to that of the main phase of the honeycomb segment 10.

Next, a manufacturing method of a honeycomb segment with spacer 10 and a manufacturing method of a honeycomb structure 1 formed by bonding the segments 10 will be described.

In the first place, a honeycomb segment without spacers 11 is manufactured in the following manner. As a raw material powder for the honeycomb segment, the aforementioned preferable material, for example, a silicon carbide power is used, and binders, for example, methyl cellulose and hydroxypropoxylmethyl cellulose, a surfactant, and water are added to the material to prepare kneaded clay having plasticity. The clay is subjected to extrusion forming to form a honeycomb segment (without spacers 11) as shown in FIG. 1, for example. That is, a honeycomb segment 10 having a plurality of cells 3 defined by porous partition walls 2, extending through the axial direction, and functioning as fluid passages is formed.

After a plurality of honeycomb segments 10 are dried by, for example, microwaves and hot air, a clogging-inhibition tape (mask tape) for inhibiting clogging of the cells 3 due to a bonding material is attached to each of the end faces 8, and a spacer-forming material having, for example, the same composition as the clay is applied on the outer peripheral surfaces 7s to form spacers 11 as shown in FIGS. 1 to 4. Specifically, an unsolidified spacer-forming material to form spacers is deposited in the aforementioned regions toward inside in the axial direction from both the ends of the axial direction on the outer peripheral surfaces 7s of the outer peripheral walls 7 of the honeycomb segments 10, and the spacer-forming material is solidified to form spacers 11 having a length of 30 to 80% of the route length.

By forming the spacers 11, the honeycomb segments 10 can be bonded with a fixed thickness of the bonding layer 5 to manufacture a honeycomb structure.

Figure 5:
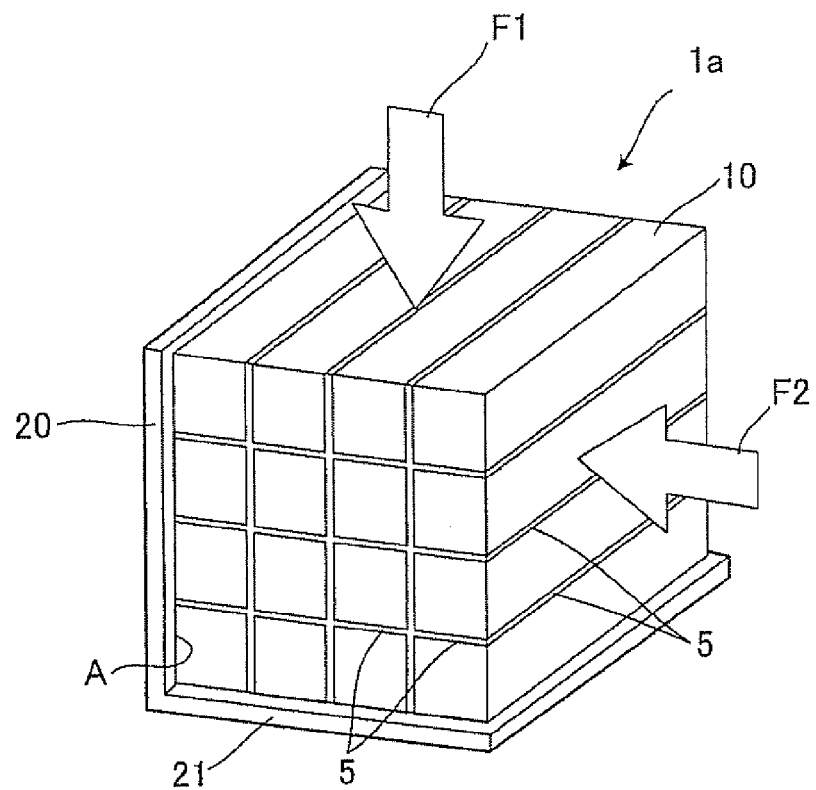
FIG. 5 is a schematic view showing assembled honeycomb segment with spacers.

FIG. 5 shows a bonding method for a honeycomb segment bonded body 1a as an embodiment of the present invention. The honeycomb segment bonded body 1a is constituted of a plurality of ceramic porous honeycomb segments 10 each having a large number of cells 3 partitioned by partition walls 2 and extending through in the axial direction and bonded by means of bonding layers 5.

Specifically, as shown in FIG. 5, in a holding area A formed to have a L-shaped cross section by the vertical backing plate 20 and the horizontal backing plate 21, honeycomb segments 10 are assembled by interposing a bonding layer 5 between bonding faces which are the outer peripheral walls 7. They are assembled in such a manner that two faces of each of the segments 10 are disposed along the vertical backing plate 20 and the horizontal backing plate 21.

The bonding material for the bonding layer 5 contains inorganic particles and an inorganic adhesive as the main components, and an organic binder, a surfactant, a resin balloon, water, and the like as accessory components. As the inorganic particles, there can be employed plate-shaped particles, spherical particles, aggregated particles, fibrous particles, acicular particles, or the like. As the inorganic adhesive, there can be employed colloidal silica ($SiO_2$ sol), colloidal alumina (alumina sol), various kinds of oxide sol, ethyl silicate, liquid glass, silica polymer, aluminum phosphate, or the like. It is preferable that the main components contain a ceramic powder in common with the components constituting the honeycomb segment 10 and that the main components do not contain fibrous particles such as ceramic fibers from the view point of health problems but contain plate-shaped particles. As the plate-shaped particles, there may be employed, for example, mica, talc, boron nitride, or glass flakes. The bonding material is applied on a bonding face of the honeycomb segment 10 to form a bonding layer 5. The bonding layer 5 may be formed on the honeycomb segment 10 before piling up of the honeycomb segments 10 or may be formed on the exposed bonding faces of the honeycomb segments 10 already assembled. In addition, the honeycomb segments 10 are assembled one by one.

As shown in FIG. 5, after the predetermined number (16 in the present embodiment) of honeycomb segments 10 are assembled, pressure is applied simultaneously in the arrow F1 direction and the arrow F2 direction to the whole honeycomb segments via the honeycomb segments 10 located in the outermost layers. At this time, since two faces of the assembled body are covered by the vertical backing plate 20 and the horizontal backing plate 21, pressure is applied simultaneously in the directions of the arrows F1 and F2 to the whole area of the other two faces. For a power for applying pressure, an air cylinder, an oil hydraulic cylinder, or the like may be used. Thus, also in the case of piling up honeycomb segments 10, the bonding layers are not crashed by pressure because the spacers 11 are formed.

Figure 6:
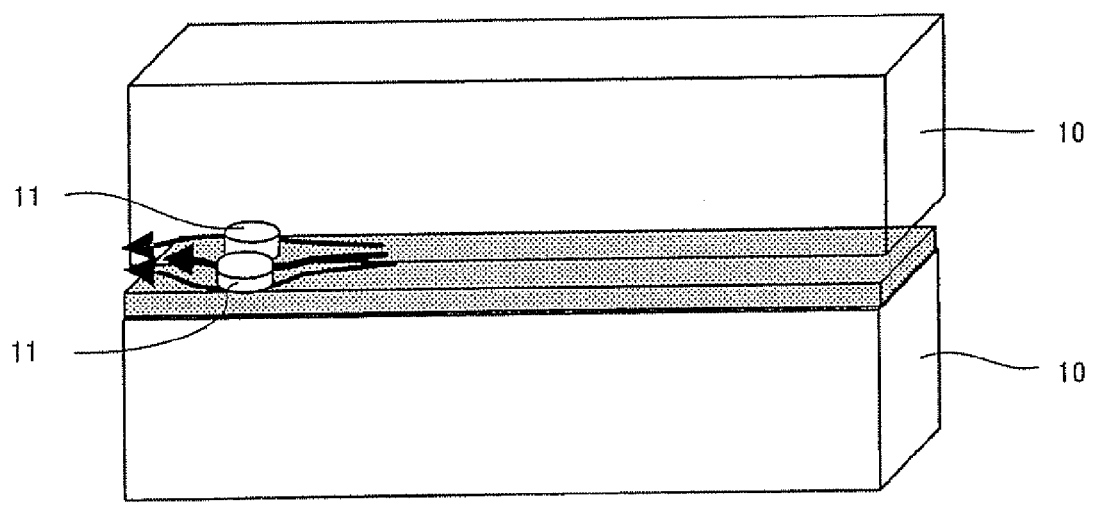
FIG. 6 is a schematic view describing protrusion of a conventional bonding material.
Figure 7:
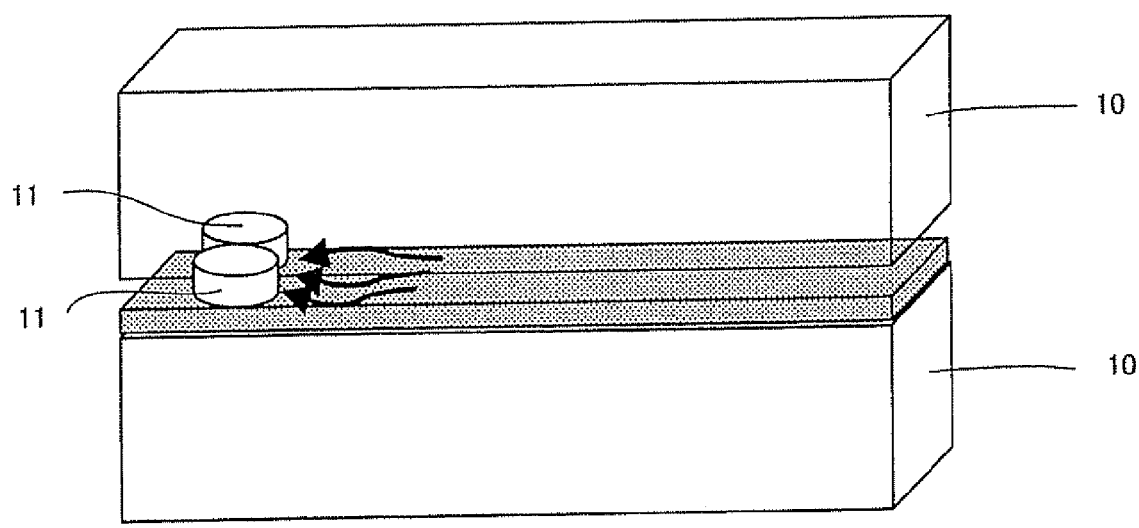
FIG. 7 is a schematic view describing protrusion of a bonding material of the present invention.

In addition, conventionally, as shown in FIG. 6, spacers 11 were small, and a bonding material protruded upon pressurization to make the bonding width uneven. As described above, by forming spacers 11 having a length of 30 to 80% of a route length by increasing the spacer application amount, protrusion of the bonding material is suppressed as much as possible as shown in FIG. 7, which enables to stabilize the bonding width. That is, since spacers of a fixed amount or more are present, the bonding width can be uniformalized by the effect of hindering the movement of the bonding material in the end face direction. On the other hand, when the spacers 11 having a length of above 80% of the route length are formed, flowability of the bonding material decreases too much, and the bonding layer becomes thick.

As described above, a plurality of honeycomb segments 10 are bound by means of the bonding layers 5 to obtain a honeycomb segment bonded body 1a. Then, a part of the outer periphery of the honeycomb segment bonded body 1a is removed, and a coating material is applied to manufacture a honeycomb structure 1 as shown in FIG. 8. Incidentally, when the honeycomb structure 1 is dried, the mask tape attached to the end faces 8 upon bonding the honeycomb segments 10 is peeled off lest the drying speed of the end faces 8 should be slow.

EXAMPLES

Hereinbelow, the present invention will be described in more detail on the basis of Examples. However, the present invention is by no means limited to these Examples.

The honeycomb segments were assembled to form 6 rows×6 rows to manufacture a SiC-DPF (capacity of 2.5 L, partition wall thickness of 12 mil, cell density of 300 cpsi) having an average pore size of 25 μm and a porosity of 58%. Incidentally, for the spacers formed for assembling, there was used a ceramic adhesive (spacer-forming material) constituted of a material containing SiC (40 mass %) as the main material, ceramic fibers of 60 mass %, a pore former of 12 mass % as an extra addition without SiC and ceramic fibers, a surfactant, and water. The spacer-forming material was solidified by heating at 180° C. for 45 seconds, and the spacers each having a design value of a thickness (bonding width) of 1.0 mm were formed on all the outer peripheral surfaces (four faces) of the outer peripheral walls.

Four spacers (two for each end face) were disposed in a circular state for one side face (one outer peripheral surface) (see FIG. 1). An experiment was performed regarding the case where the spacers were disposed on one face and the case where the spacers were disposed on both faces. Incidentally, the spacer thickness in the case of disposing spacers on one face was 1.0 mm, and the spacer thickness in the case of disposing spacers on both faces was 0.5 mm for one face (1.0 mm in total for both faces). The spacers were formed with varying the distance from the end face. Table 1 shows the results of the measurement for the bonding width by carrying out the bonding test in various kinds of spacer disposition methods.

TABLE 1

| | Proportion of distance of spacer from end face to whole length | Spacer disposition | Spacer ratio (%) (b/a) × 100 | Bonding width (mm) |
|---|---|---|---|---|
| Example 1 | 20 | 2 sides | 30 | 1.00 |
| Example 2 | 20 | 2 sides | 40 | 1.02 |
| Example 3 | 20 | 2 sides | 50 | 1.01 |
| Example 4 | 20 | 2 sides | 60 | 1.02 |
| Example 5 | 20 | 2 sides | 70 | 1.02 |
| Example 6 | 20 | 2 sides | 80 | 1.02 |
| Example 7 | 20 | 4 sides | 30 | 1.01 |
| Example 8 | 20 | 4 sides | 40 | 1.02 |
| Example 9 | 20 | 4 sides | 50 | 1.03 |
| Example 10 | 20 | 4 sides | 60 | 1.02 |
| Example 11 | 20 | 4 sides | 70 | 1.05 |
| Example 12 | 20 | 4 sides | 80 | 1.03 |
| Example 13 | 5 | 2 sides | 30 | 1.02 |
| Example 14 | 10 | 2 sides | 30 | 1.02 |
| Comp. Ex. 1 | 20 | 2 sides | 10 | 0.64 |
| Comp. Ex. 2 | 20 | 2 sides | 20 | 0.80 |
| Comp. Ex. 3 | 20 | 2 sides | 90 | 1.15 |
| Comp. Ex. 4 | 20 | 4 sides | 10 | 0.71 |
| Comp. Ex. 5 | 20 | 4 sides | 20 | 0.85 |
| Comp. Ex. 6 | 20 | 4 sides | 90 | 1.23 |
| Comp. Ex. 7 | 30 | 2 sides | 30 | 0.82 |

It was found out that, when the spacer ratio is 30% or more, 1.0 mm of desired bonding width could be obtained stably regardless of one face or both faces. When the spacer ratio is 20% or less (Comparative Examples 1, 2, 4, and 5), bonding width was below 1.0 mm, and protrusion amount of the bonding material from the end face actually increased. On the other hand, when the spacer ratio was 90% (Comparative Examples 3 and 6), two spacers overlapped with each other. Therefore, bonding width tended to be thick by 10% or more. Therefore, an appropriate range as the spacer ratio is considered to be 30 to 80%. In addition, bonding width can be made as desired in Examples where spacers were formed within the range of 20% of the long side of the outer peripheral surface from the end face, while bonding width was reduced to a large extent in Comparative Example 7.

The present invention can be used as a carrier for an internal combustion engine, a boiler, a chemical reactor, fuel cell reformer, or the like, or a filter for trapping particulate matter in exhaust gas, or the like and a honeycomb segment with spacer can used in a manufacturing method of a honeycomb structure constituted of a plurality of honeycomb segments.

What is claimed is:

1. A honeycomb segment with spacer comprising:
   a plurality of cells defined by porous partition walls, extending through an axial direction, and functioning as fluid passages, and
   spacers arranged in a predetermined region from one end face of the axial direction along the axial direction on an outer peripheral surface of an outer peripheral wall and in a predetermined region from the other end face of the axial direction along the axial direction;
   wherein the spacers are formed so as to occupy 30 to 80% of a route length through the center from a long side to the other long side of an outer peripheral surface of an outer peripheral wall, and the spacers are formed in a region within 20% of the long side from one end face of the axial direction along the axial direction and in a region within 20% of the long side from the other end face along the axial direction.

2. The honeycomb segment with spacer according to claim 1, wherein the spacers are arranged along a short side direction in one of the ranges to occupy 30 to 80% of a length of the short side in the short side direction.

3. A honeycomb structure formed by assembling a plurality of honeycomb segments with spacers, wherein each of a honeycomb segment with spacer comprising a plurality of cells defined by porous partition walls, extending through an axial direction, and functioning as fluid passages, and spacers arranged in a predetermined region from one end face of the axial direction along the axial direction on an outer peripheral surface of an outer peripheral wall and in a predetermined region from the other end face of the axial direction along the axial direction so as to occupy 30 to 80% of a route length through the center from a long side to the other long side of an outer peripheral surface of an outer peripheral wall, wherein the spacers are formed in a region within 20% of the long side from one end face of the axial direction along the axial direction and in a region within 20% of the long side from the other end face along the axial direction.

4. The honeycomb structure according to claim 3, wherein the spacers are arranged along a short side direction in one of the ranges to occupy 30 to 80% of a length of the short side in the short side direction.

* * * * *